United States Patent
Thimm et al.

(10) Patent No.: US 7,569,798 B2
(45) Date of Patent: Aug. 4, 2009

(54) TEMPERATURE SENSOR BASED ON RESISTANCE MEASUREMENT AND RADIANT HEATER WITH SUCH A TEMPERATURE SENSOR

(75) Inventors: Wolfgang Thimm, Karlsruhe (DE); Wolfgang Wittenhagen, Gundelsheim (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 132 days.

(21) Appl. No.: 11/420,634

(22) Filed: May 26, 2006

(65) Prior Publication Data

US 2006/0289460 A1    Dec. 28, 2006

Related U.S. Application Data

(63) Continuation of application No. PCT/EP2004/013525, filed on Nov. 29, 2004.

(30) Foreign Application Priority Data

Nov. 28, 2003  (DE)  ................. 103 56 432

(51) Int. Cl.
*H05B 3/68* (2006.01)
(52) U.S. Cl. ................. 219/446.1; 219/460.1
(58) Field of Classification Search ... 219/443.1–468.2, 219/509, 510, 518; 392/407, 448; 338/230–249
See application file for complete search history.

(56) References Cited

U.S. PATENT DOCUMENTS

| 2,780,703 | A | * | 2/1957 | MacIntyre | ................. 338/28 |
| 3,267,733 | A | | 8/1966 | Chambers | |
| 3,418,648 | A | * | 12/1968 | Futaki | ................. 340/595 |
| 3,541,378 | A | * | 11/1970 | Pebler | ................. 313/579 |
| 3,789,190 | A | * | 1/1974 | Orosy et al. | ................. 219/497 |
| 4,414,465 | A | | 11/1983 | Newton et al. | |
| 4,868,371 | A | * | 9/1989 | Crossley et al. | ........ 219/448.17 |
| 5,177,339 | A | * | 1/1993 | McWilliams et al. | ..... 219/461.1 |
| 5,877,475 | A | | 3/1999 | Hecht et al. | |
| 6,150,641 | A | * | 11/2000 | Wilkins | ................. 219/512 |
| 6,272,735 | B1 | | 8/2001 | Moriwake et al. | |
| 6,538,238 | B1 | | 3/2003 | Berkcan et al. | |
| 6,752,531 | B2 | * | 6/2004 | McWilliams | ................. 374/149 |

(Continued)

FOREIGN PATENT DOCUMENTS

CN       2057751 U       5/1990

(Continued)

OTHER PUBLICATIONS

International Search Report from PCT/EP2004/013525 dated May 18, 2005.

(Continued)

*Primary Examiner*—Sang Y Paik
(74) *Attorney, Agent, or Firm*—Alston & Bird LLP

(57) ABSTRACT

A temperature sensor is disclosed comprising a sensor element having a temperature-dependent resistance that is enclosed with a tube. In one embodiment, the tube is a quartz glass tube. In another embodiment the temperature sensor is a conventional halogen lamp, designed for use as a light source. The temperature sensor can be advantageously to precisely measure temperatures in a radiant heater, such as that present in a electric cooking appliance.

6 Claims, 3 Drawing Sheets

U.S. PATENT DOCUMENTS 6,995,344 B2    2/2006    McWilliams

FOREIGN PATENT DOCUMENTS

| CN | 1163736 | 11/1997 |
|---|---|---|
| DE | 19537431 A1 | 4/1997 |
| DE | 19925367 A1 | 1/2000 |
| EP | 0 138 314 A1 | 4/1985 |
| FR | 2521293 | 8/1983 |
| GB | 1257 148 | 12/1971 |
| GB | 2 072 334 A | 9/1981 |

OTHER PUBLICATIONS

Chinese Office Action for Chinese Application No. 200480040595.8.

\* cited by examiner

TEMPERATURE SENSOR BASED ON RESISTANCE MEASUREMENT AND RADIANT HEATER WITH SUCH A TEMPERATURE SENSOR

CROSS-REFERENCE TO RELATED APPLICATIONS

This application is a continuation of PCT/EP 2004/013525 filed on Nov. 29, 2004, which in turn claims priority to German Appl. No. 103 56 432.2 filed on Nov. 28, 2003.

FIELD OF THE INVENTION

The invention generally relates to a temperature sensor based on resistance measurement that may be used in a radiant heater in an electric cooking appliance, as well as a radiant heater using a conventional filament, halogen lamp or a halogen radiant heater as a temperature sensor.

BACKGROUND OF THE INVENTION

It is known to provide the cooking areas of heating elements with a sensor system that switches the heating means off when the heating elements reach a maximum permitted temperature. Generally, use is made of a rod-type thermostat made from two different materials with different thermal expansion coefficients. As a result of heating the different materials to a predetermined temperature, two contacts are separated from each other so that the power supply to the heating device of the cooking area is interrupted. Such a rod-type thermostat is disadvantageous in that a change to the switching point requires considerable effort and that the rod-type thermostats only react slowly to temperature changes.

The problem then is to provide a temperature sensor and a radiant heater to eliminate the disadvantages of the prior art and ensure high precision, safety, and low production costs.

BRIEF DESCRIPTION OF THE SEVERAL VIEWS OF THE DRAWINGS

Figure 1:
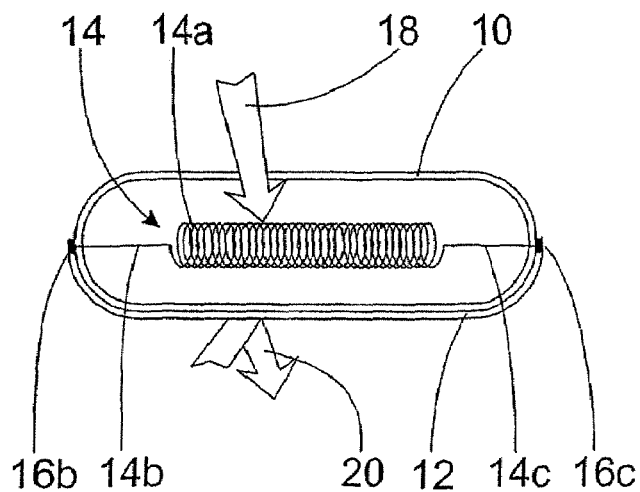

Having thus described the invention in general terms, reference will now be made to the accompanying drawings, which are not necessarily drawn to scale, and wherein:

FIG. 1 illustrates a cross-sectional view of one embodiment of the inventive temperature sensor.

Figure 2:
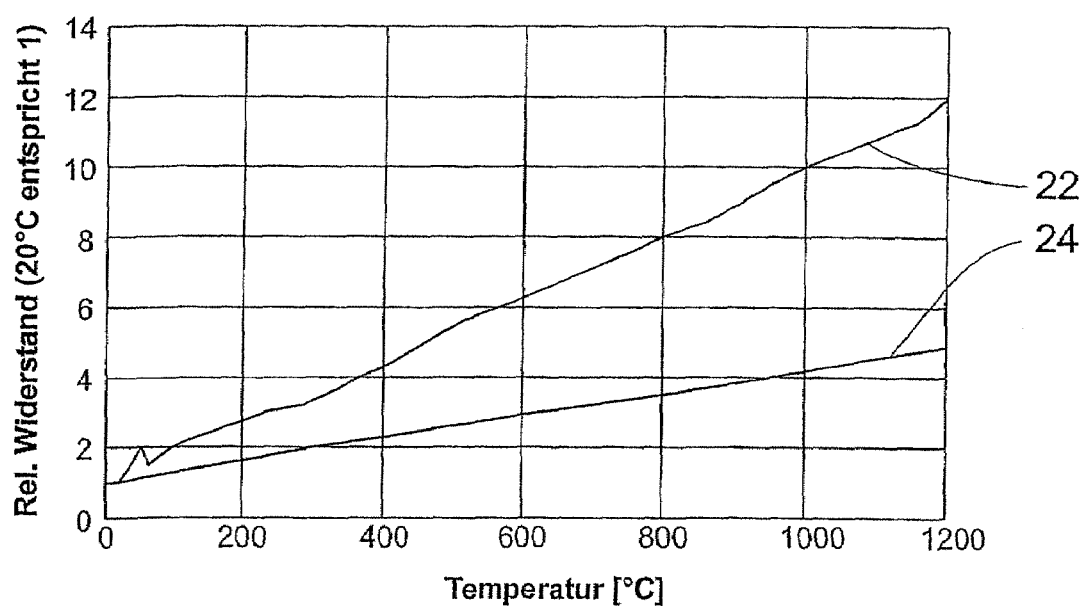

FIG. 2 illustrates a graph showing the relative resistance of a platinum resistor and a commercial halogen lamp over the temperature.

Figure 3:
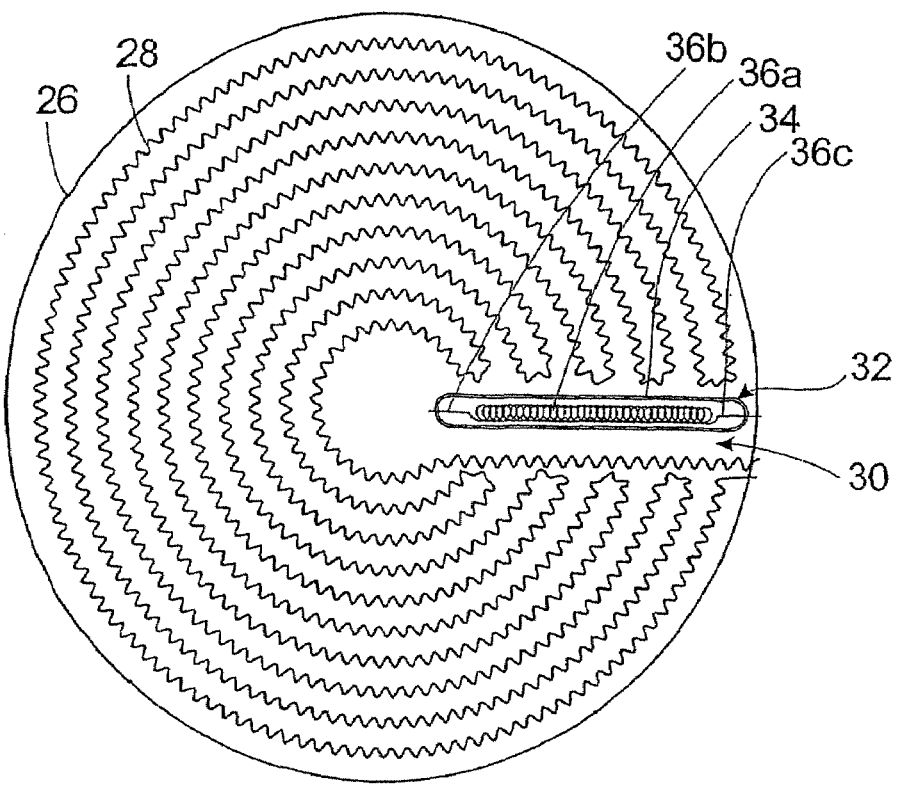

FIG. 3 illustrates a plan view of a radiant heater with a second embodiment of the inventive temperature sensor.

Figure 4:
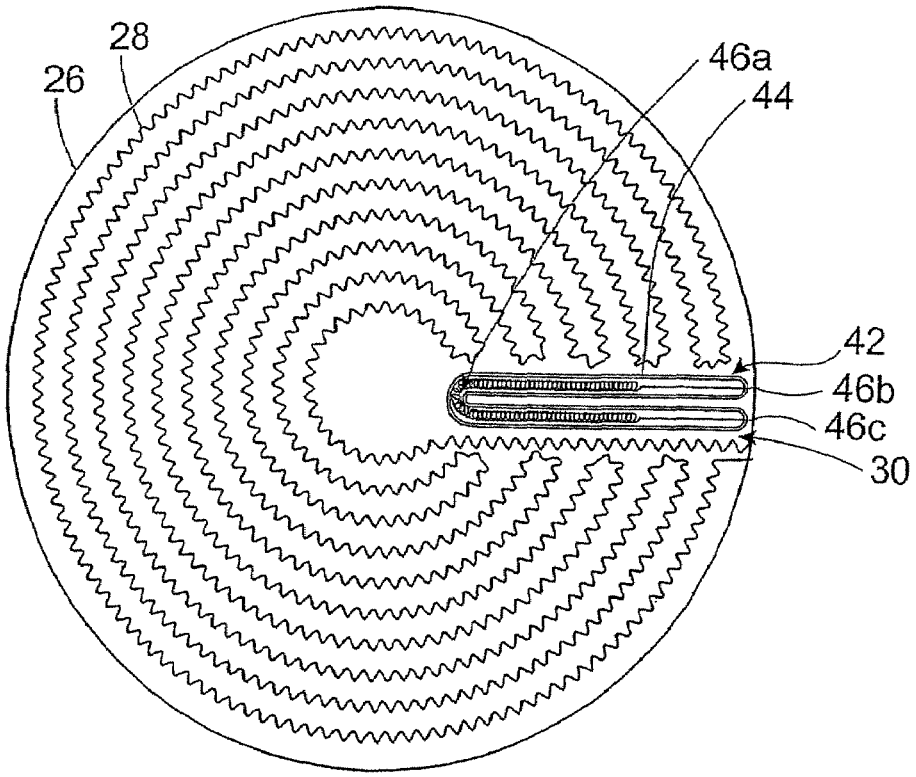

FIG. 4 illustrates a plan view of a radiant heater with a third embodiment of the inventive temperature sensor.

Figure 5:
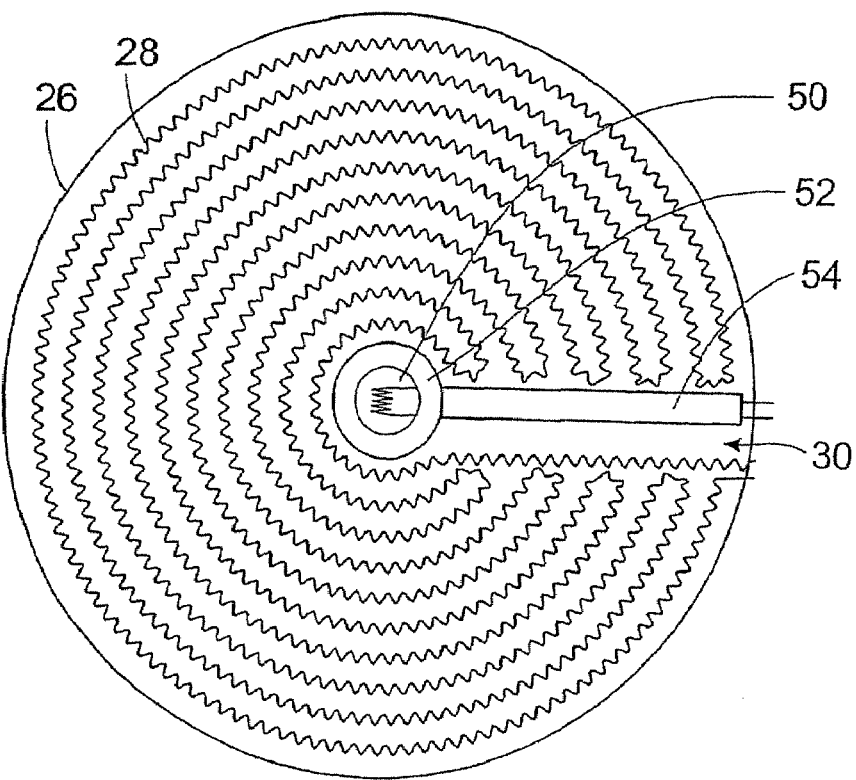

FIG. 5 illustrates a plan view of a radiant heater with a fourth embodiment of the inventive temperature sensor.

Figure 6:
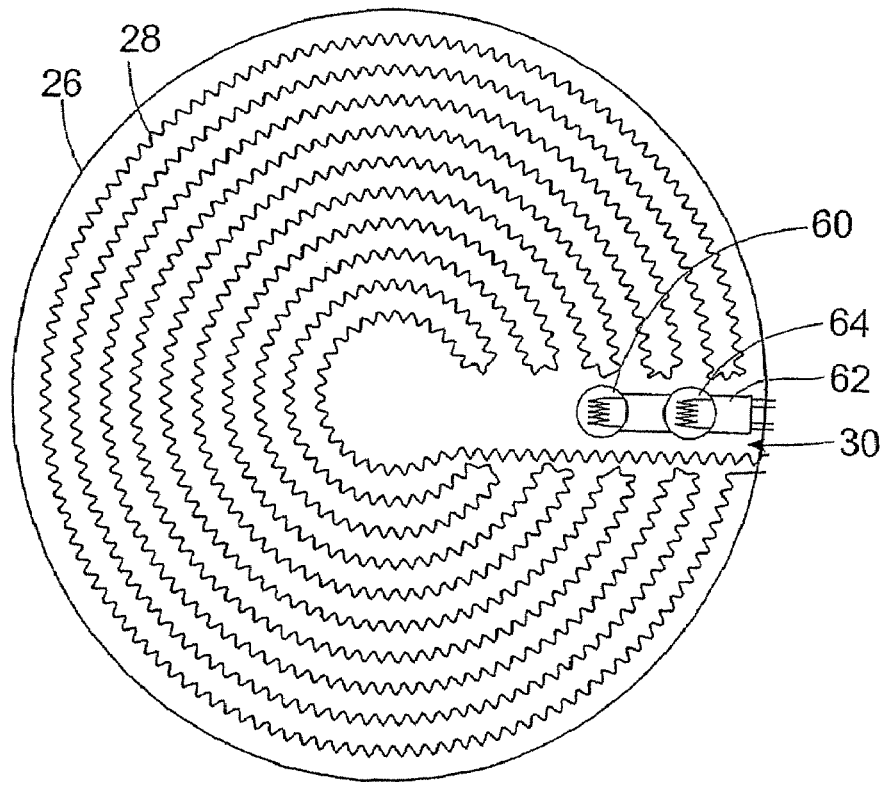

FIG. 6 illustrates a plan view of a radiant heater using the inventive temperature sensor in the fourth embodiment.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The present invention overcomes the problems of the prior art by having a temperature sensor that has a sensor element made from a material having positive temperature coefficients, particularly with a higher temperature coefficient than precious metals. The temperature sensor also has an envelope within which the sensor element is placed. This temperature sensor makes it possible to electronically determine the temperature of a heating element at any time. To switch off the heating means of the heating element, the temperature sensor can either be connected to a simple circuit provided for this purpose or to a control unit of the heating element that evaluates the resistance and if necessary switches off or controls the heating element in programmed manner. As a result of the positive temperature coefficient, the resistance of the temperature sensor increases with rising temperature. By measuring the voltage drop at the sensor element and the current flow through the sensor element, it is possible to calculate the resistance and draw conclusions concerning the temperature. It is alternatively possible to provide a power supply with a constant current intensity or a voltage source with a constant voltage, so that in each case only the other quantity has to be measured. If high demands are made on the accuracy of the temperature measurement, it is possible to use a four-conductor circuit in place of the conventional two-conductor circuit, in which two conductors are used for supplying a constant current to the sensor element and the two other conductors are used for determining the voltage drop at the resistor. The advantage of the four-conductor circuit is that the resistance of the leads is unimportant. The higher the temperature coefficient, the higher the precision of the measured results. A high temperature coefficient of the sensor element leads to a significant change to the resistance value in the case of a small temperature change. The temperature sensor according to the invention has a high reaction rate. The present invention also has a low production cost because no mechanisms are needed. Unlike rod-type thermostats, the thermostat of present invention can be used in cooking areas of a heating element of a kitchen appliance, in a inconspicuous manner and does not, or only slightly, interferes with the glow pattern of the cooking area.

The sensor element may be encapsulated in a envelope that advantageously has at least, in part, a transparent portion for heat radiation, and it mechanically protects the temperature sensor. It can also constitute an electrical insulating layer so that it is possible to fit the temperature sensor adjacent to conductive surfaces. As a result of the high transparency for thermal radiation, it is ensured that the sensor element is reached by the thermal radiation and consequently a resistance change occurs as heat is detected.

According to one embodiment of the invention, the temperature-dependent resistor is made from a material with a higher temperature coefficient than platinum.

According to another embodiment of the invention, the envelope, at least in part, has a high transparency for thermal radiation, and, as a result, the sensor element is reached by the thermal radiation and consequently causes a resistance change. According to an alternative embodiment of the invention, the sensor element completely fills the envelope.

According to another embodiment of the invention, the envelope is made from an insulating material, such as preferably glass, ceramic or quartz, or has several layers, of which the innermost layer is an insulating material. The insulating material makes it possible to fit the temperature sensor directly to electrically conducting components, particularly of a heating element. In the case of envelopes with several layers, it is possible to make only one layer insulating, while allowing the other layers fulfil other functions.

According to another embodiment of the invention, the envelope is wholly or partly constructed with at least one layer of a mechanically stable material, preferably metal. Such a stabilizing layer leads to reduced susceptibility to mechanical damage and provide an increase in the durability of the temperature sensor.

In a further embodiment of the invention, the envelope is sealed in a gas-tight manner, preferably such that the internal pressure of the envelope is lower than the external pressure of the envelope or such that the interior is evacuated. In an envelope designed this way, the sensor element is protected against glow due to current flow. In the case of certain PTC sensor elements made from ceramic materials, it is particularly vital to have protection against oxygen.

According to another embodiment of the invention, within the temperature sensor envelope there is an inert gas, preferably nitrogen, helium, halogen or a rare gas such as argon or a mixture of corresponding gases. Through the use of inert gas, there is no need to reduce the pressure in the envelope to prevent the sensor element from coming into contact with oxygen. Instead, for similar pressure ratios within and also outside the envelope, use is made of an inert gas, which does not impair the durability of the sensor element.

According to a another embodiment of the invention, the envelope has at least in part a reduced transmissivity for thermal radiation and preferably the reduced transmissivity areas have a thermally reflective construction. As a result of such reduced transmissivity areas, it is possible to perform a directional temperature measurement. The directional temperature measurement makes it possible to record only the thermal radiation from specific directions by means of the sensor element. Thermal radiation from the directions in which the envelope has a reduced transmissivity has a reduced influence on the measured value. Due to constructing the areas in a reflective manner with respect to the thermal radiation, the influence of the thermal radiation is completely avoided. When using the inventive temperature sensor for heating elements, it is possible to use the temperature sensor to selectively determine the glass ceramic temperature without the thermal radiation of the radiant heater significantly influencing the measurement.

According to another embodiment of the invention, the sensor element material is an iron-based alloy in which the crystal structure of the alloy does not undergo any transformation in the temperature range to be measured. Conventional operating temperatures determine the temperature range to be measured. These are generally temperatures of a few hundred degrees Celsius, normally about 600° C. Maintaining the specific crystal structure of the iron sensor element offers the advantage avoiding a phase transition during normal operation and provides better durability of the temperature sensor.

According to an alternative embodiment of the invention, the sensor element material is tungsten, molybdenum, or an alloy based on tungsten or molybdenum. Such alloys are known through use in halogen lamps or bulbs.

According to another embodiment of the invention, the sensor element material is a cobalt-iron alloy, e.g., an alloy with approximately 70% cobalt-iron. Such a material is obtainable under the designation "CF 25" from the firm Vacuumschmelze.

According to another embodiment of the invention, the sensor element material is an electrically conductive ceramic material.

According to another embodiment of the invention, the sensor element has a low thermal capacity or a small cross-section.

The problem of the invention is also solved by a radiant heater with heating means, particularly with a heating coil, a heating band, a halogen radiator or an induction system, having the features as claimed herein, in which the radiant heater has a temperature sensor of the above-described type. The present invention is superior in many respects compared to the standard rod-type thermostat. The rod-type thermostat has a non-variable switching point and is complicated to change the switching point of heating element in a heater. The temperature sensor, however, permits a continuous temperature measurement. In addition, the temperature sensor according to the invention only has a limited thermal inertia.

According to another embodiment of the invention, a conventional filament or halogen lamp is provided as the temperature sensor of the radiant heater. This represents an ideal cost solution given the mass production of filament and halogen lamps. The cost of a conventional filament or halogen lamp is much less than that of a rod-type thermostat.

According to the invention, a conventional halogen radiant heater can also be used as a temperature sensor. In the case of a cyclically operated halogen radiant heater in which there are phases or periods of no heating, it is possible to measure the temperature during the period in which no heat is generated. In the case of cooking areas associated with several independently controllable halogen radiant heaters, a halogen radiant heater that is not used for heating purposes can be used as a temperature sensor.

According to the invention, it is possible to use a lamp as a sensor in electric heating appliances having internal lighting, e.g., a lamp used in conventional baking or microwave ovens. It is, for example, conceivable in a cyclic operation to sometimes use a lamp for internal lighting and as a temperature sensor. It is also possible to provide a first lamp fulfilling only a lighting function and a second lamp located in the interior of an electric heating appliance, which in the case of a closed flap serves as a temperature sensor and in the case of an opened flap or door serves as an additional lighting means.

Apart from determining the temperature, it is also possible to use the inventive temperature sensor as a coil, particularly as a coil with a linear conductor so as to serve as a cookware detection sensor. Such sensors are able to detect the presence and size of a metallic pot or pan on the cooking area by means of an electromagnetic field (the characteristics of which change depending on the placement of the saucepan). This is, for example, described in EP-A-1 276 350, to which express reference is made for incorporation.

A further possibility is provided by the option of using the sensor temperature for so-called sensor-controlled cooking with predeterminable temperature gradients. As a result, the cooking process is so-to-speak controlled by itself. Particularly a higher temperature coefficient than platinum is advantageous in this connection, because the precision is greater.

In one embodiment, FIG. 1 shows a temperature sensor according to the invention, which has an envelope 10 with a tubular extension. The two ends of the envelope 10 are closed and sealed in a gas-tight manner. The envelope has a reflective coating 12 on one side, such that no thermal radiation can penetrate the envelope. A sensor element 14 is provided within the envelope 10, the sensor element 14 being oriented parallel to the main extension direction of the envelope 10. The sensor element 14 has a coil 14a and two lead wires 14b, 14c. The lead wires 14b, 14c pass out of the envelope at the ends thereof and issue into connecting contacts 16b, 16c of the temperature sensor.

Thermal radiation 18 striking the non-reflective side enters the envelope 10 and heats the sensor element 14 and the coil 14a. As a result of the PTC (positive temperature coefficient) characteristics of the coil 14a, the electrical resistance rises with the temperature. A voltage measurement at the connecting contacts 16b, 16c and the current intensity enables conclusions to be drawn concerning the resistance of the coil 14a and therefore the temperature. Thermal radiation 20 striking the reflective side of the envelope is unable to penetrate and is reflected. Essentially, it has no influence on the sensor element 14.

FIG. 2 is a graph showing the relative resistance change as a function of the temperature. A temperature range of 0° C. to 1000° C. is plotted on the horizontal axis; the relative resistance is plotted on the vertical axis. The value 1 on the vertical axis is defined as ambient temperature. Graph 22 is based on a conventional halogen lamp; graph 24 illustrates the behavior of a platinum PTC resistor. The graphs illustrate that the relative resistance of a conventional halogen lamp in the manner shown in graph 22 rises more rapidly with increasing temperature than the relative resistance of the platinum PTC resistor shown in graph 24. For example, the resistance of a conventional halogen lamp rises approximately ten times with a temperature increase from ambient temperature to 1000° C. In contrast, with the same temperature increase, the platinum PTC element only leads to a resistance change by a factor of approximately 4. Graph 24 also illustrates that the platinum PTC resistor has a largely linear rise. Graph 22 shows that with a conventional halogen lamp the ratio between the relative resistance and the temperature is not completely proportional. However, this lack of proportionality does not affect the use of a conventional halogen lamp as a temperature sensor.

FIGS. 3 through 6 each show a radiant heater 26 with a different embodiment of the inventive temperature sensor 32, 42, 50, 60, 64. Each of the radiant heaters has a heating band 28 arranged in concentric circular portions, and may be used in conventional cooking appliances. All four radiant heaters have an area 30 recessed from the heating band 28 in which a particular embodiment of the temperature sensor is located: temperature sensor 32, 42, 50 or two temperature sensors 60, 64.

The temperature sensor 32 shown in FIG. 3 has a straight, tubular envelope sealed at both ends in gas-tight manner. At both ends of the envelope 34, connecting wires 36b, 36c are guided therein. A sensor element 36a in coil form is placed between the connecting wires 36b, 36c. Connecting wire 36c passes laterally out of the radiant heater whereas connection wire 36b passes out from the radiant heater at the bottom, in a manner not visible in FIG. 3.

The radiant heater shown in FIG. 4 has a temperature sensor 42 configured differently. It has an envelope 44 in the form of a tube bent in a U-shaped manner. This leads to two legs, which are directed outwards relative to the radiant heater. In a manner similar to that of the temperature sensor 32 of the radiant heater shown in FIG. 3, the temperature sensor 42 has two lead wires 46b, 46c and a sensor element in the form of a coil 46a. As a result of the U-shaped construction of the temperature sensor 42, the design advantage is obtained that both leads wires 46b, 46c can be led to the outside of the radiant heater, instead of requiring a much more complicated supply near the center of the radiant heater. This could also be achieved by a different wire guidance in the envelope.

The radiant heater 26 shown in FIG. 5 has an inventive temperature sensor 50 provided with a spherical envelope in which there is a coil. It could also be located at a different point of the radiant heater, e.g., closer to the edge. A reflector 52 is placed between the temperature sensor 50 and the substrate of radiant heater 26. This ensures that the temperature measured by the temperature sensor 50 is mainly influenced by the thermal radiation coming from the top. Thermal radiation coming from the bottom is largely reflected and consequently hardly falsifies the measurement. The lines to the temperature sensor are guided in an insulated jacket 54, ensuring that the line resistance remains largely constant and therefore has no influence on the temperature measurement. The jacket 54 and reflector 52 can also be constructed in one piece or in such a way that the jacket 54 keeps the reflector 52 in position.

FIG. 6 shows a radiant heater 26 having two temperature sensors 60, 64, which are of the same type as shown in FIG. 5. They are arranged at different distances from the center of the radiant heater 26 and consequently permit the temperature measurement to take place at different locations of the radiant heater 26. As with the radiant heater 26 shown in FIG. 5, the lines are provided with an envelope 62 in order to prevent a temperature-dependent resistance change in the lines and a resulting falsification of the temperature measurement. Reflectors could also be provided for each temperature sensor.

That which is claimed:

1. A temperature sensor based on resistance measurement comprising:

a sensor element with a temperature-dependent resistor made from a metal selected from the group of tungsten and molybdenum having a positive temperature coefficient, said sensor element having a first connection wire and a second connection wire, wherein said sensor element has a U-shape with said first connection wire positioned parallel to said second connection wire; and an envelope in which said sensor element is located and said first connection wire and said second connection wire pass through said envelope, wherein said envelope is made from an insulating material having a first area comprising a reflective coating for blocking thermal radiation and having a second area without said reflective coating having a high transparency to thermal radiation, said envelope forming a gas-tight container comprising at least one inert gas selected from the group consisting of nitrogen, helium, halogen, and argon, said envelope having an internal pressure different from that of an external pressure.

2. A temperature sensor based on resistance measurement comprising:

a sensor element with a temperature-dependent resistor made from a cobalt-iron alloy having a positive temperature coefficient whose crystalline structure does not undergo a transformation in the temperature range to be measured, said sensor element having a first connection wire and a second connection wire, wherein said sensor element has a U-shape with said first connection wire positioned parallel to said second connection wire; and an envelope in which said sensor element is located and said first connection wire and said second connection wire pass through said envelope, wherein said envelope is made from an insulating material having a first area comprising a reflective coating for blocking thermal radiation and having a second area without said reflective coating having a high transparency to thermal radiation, said envelope forming a gas-tight container comprising at least one inert gas selected from the group consisting of nitrogen, helium, halogen, and argon, said envelope having an internal pressure different from that of an external pressure.

3. A temperature sensor based on resistance measurement comprising:

a sensor element with a temperature-dependent resistor made from an iron-based alloy having a positive temperature coefficient whose crystalline structure does not undergo a transformation in the temperature range to be measured, said sensor element having a first connection wire and a second connection wire, wherein said sensor element has a U-shape with said first connection wire positioned parallel to said second connection wire; and an envelope in which said sensor element is located and said first connection wire and said second connection wire pass through said envelope, wherein said envelope is made from an insulating material having a first area comprising a reflective coating for blocking thermal radiation and having a second area without said reflective coating having a high transparency to thermal radiation, said envelope forming a gas-tight container comprising at least one inert gas selected from the group consisting of nitrogen, helium, halogen, and argon, said envelope having an internal pressure different from that of an external pressure.

4. A radiant heater assembly for a cooking appliance, comprising:

a radiant heater comprising a heating filament; and a temperature sensor, wherein said temperature sensor comprises a sensor element with a temperature-dependent resistor made from a metal selected from the group of tungsten and molybdenum having a positive temperature coefficient, said sensor element having a first connection wire and a second connection wire, wherein said sensor element has a U-shape with said first connection wire positioned parallel to said second connection wire; and an envelope in which said sensor element is located, wherein said envelope is made from an insulating material having a first area comprising a reflective coating for blocking thermal radiation and having a second area without said reflective coating having a high transparency to thermal radiation, said envelope forming a gas-tight container comprising at least one inert gas selected from the group consisting of nitrogen, helium, halogen, and argon, said envelope having an internal pressure different from that of an external pressure.

5. A radiant heater assembly for a cooking appliance, comprising:

a radiant heater comprising a heating filament; and a temperature sensor, wherein said temperature sensor comprises a sensor element with a temperature-dependent resistor made from a cobalt-iron alloy having a positive temperature coefficient whose crystalline structure does not undergo a transformation in the temperature range to be measured, said sensor element having a first connection wire and a second connection wire, wherein said sensor element has a U-shape with said first connection wire positioned parallel to said second connection wire; and an envelope in which said sensor element is located and said first connection wire and said second connection wire pass through said envelope, wherein said envelope is made from an insulating material having a first area comprising a reflective coating for blocking thermal radiation and having a second area without said reflective coating having a high transparency to thermal radiation, said envelope forming a gas-tight container comprising at least one inert gas selected from the group consisting of nitrogen, helium, halogen, and argon, said envelope having an internal pressure different from that of an external pressure.

6. A radiant heater assembly for a cooking appliance, comprising:

a radiant heater comprising a heating filament; and a temperature sensor, wherein said temperature sensor comprises a sensor element with a temperature-dependent resistor made from an iron-based alloy having a positive temperature coefficient whose crystalline structure does not undergo a transformation in the temperature range to be measured, said sensor element having a first connection wire and a second connection wire, wherein said sensor element has a U-shape with said first connection wire positioned parallel to said second connection wire; and an envelope in which said sensor element is located and said first connection wire and said second connection wire pass through said envelope, wherein said envelope is made from an insulating material having a first area comprising a reflective coating for blocking thermal radiation and having a second area without said reflective coating having a high transparency to thermal radiation, said envelope forming a gas-tight container comprising at least one inert gas selected from the group consisting of nitrogen, helium, halogen, and argon, said envelope having an internal pressure different from that of an external pressure.

* * * * *